(12) United States Patent
Knudsen

(10) Patent No.: US 7,079,650 B1
(45) Date of Patent: Jul. 18, 2006

(54) COMPUTING METHOD FOR ELLIPTIC CURVE CRYPTOGRAPHY

(75) Inventor: Erik Knudsen, Paris (FR)

(73) Assignee: Oberthur Card Systems SA, Paris (FR)

( * ) Notice: Subject to any disclaimer, the term of this patent is extended or adjusted under 35 U.S.C. 154(b) by 873 days.

(21) Appl. No.: 09/786,756

(22) PCT Filed: Jul. 7, 2000

(86) PCT No.: PCT/FR00/01979

§ 371 (c)(1),
(2), (4) Date: Jun. 20, 2001

(87) PCT Pub. No.: WO01/04742

PCT Pub. Date: Jan. 18, 2001

(30) Foreign Application Priority Data

Jul. 9, 1999  (FR) .................................. 99 08949

(51) Int. Cl.
| H04K 1/00 | (2006.01) |
| H04L 9/00 | (2006.01) |
| H04L 9/28 | (2006.01) |
| G06F 15/00 | (2006.01) |
| G06F 7/00 | (2006.01) |

(52) U.S. Cl. .......................... 380/30; 380/28; 708/492

(58) Field of Classification Search ................. 380/28, 380/30, 282, 285, 44; 713/176; 708/492
See application file for complete search history.

(56) References Cited

U.S. PATENT DOCUMENTS

| 6,141,420 A * | 10/2000 | Vanstone et al. ............. 380/30 |
| 6,490,352 B1 * | 12/2002 | Schroeppel ................... 380/30 |
| 2002/0041681 A1 * | 4/2002 | Hoffstein et al. ............. 380/28 |
| 2002/0055962 A1 * | 5/2002 | Schroeppel .................. 708/650 |
| 2004/0114760 A1 * | 6/2004 | Brown et al. ................ 380/255 |

OTHER PUBLICATIONS

Avanzi, Roberto M. et al. "Scalar Multiplication on Koblitz Curves Using the Frobenius Endomorphism and its Combination with Point Halving: Extensions and Mathematical Analysis", 2003.*

Fong, Kenny et al. "Field Inversion and Point Halving Revisited", Aug. 2004, IEEE Transactions on Computers vol. 58, No. 8.*

Gunther, Christian et al. "Speeing up the Arithmetic on Koblitz Curves of Genus Two", SAC 2000, Aug. 2000.*

Jacobson, Michael, Jr. et al. "Hyperelliptic Curves and Cryptography", 2004.*

(Continued)

*Primary Examiner*—Gilberto Barron, Jr.
*Assistant Examiner*—Michael J. Simitoski
(74) *Attorney, Agent, or Firm*—Browdy and Neimark, PLLC

(57) ABSTRACT

A fast cryptographic method between two entities exchanging data via a non-secure communication channel. The method, for example, forms a common key between two entities (A,B), each having a secret key (a,b) and using a public key (P) formed by a point of an elliptic curve (E), and includes at least multiplying the odd order point (P) by an integer by additions and halving operations.

11 Claims, 7 Drawing Sheets

OTHER PUBLICATIONS

Koblitz, Neal. "An Elliptic Curve Implementation of the Finite Field Digital Signature Algorithm", CRYPTO '98, 1998.*

Koblitz, Neal. "CM-Curves with Good Cryptographic Properties", CRYPTO '91, 1991.*

Meier, Willi et al. "Efficient Multiplication on Certain Nonsupersingular Elliptic Curves", CRYPTO '92, 1992.*

Schroeppel, Richard et al. "Fast Key Exchange with Elliptic Curve Systems", Mar. 1995.*

Solinas, Jerome A. "An Improved Algorithm for Arithmetic on a Family of Elliptic Curves", CRYPTO '97, 1997.*

Guajardo, Jorge. "Efficient Algorithms for Elliptic Curve Cryptosystems", Thesis of May 1997.*

Kenji Koyama et al.: "Elliptic Curve Cryptosystems and Their Applications", IEICE Transactions on Information and Systems, JP, Institute of Electronics Information and Comm. Eng. Tokyo, vol. E75-D, No. 1, Jan. 1992, pp. 50-57.

Advances in Cryptology—Eurocrypt, International Conference on the Theory and Application of Cryptographic Techniques, DE, Berlin, Springer, May 12, 1996, pp. 49-59.

Knudsen E W: "Elliptic Scalar Multiplication Using Point Halving" Advances in Cryptology—Asiacrypt'99. International Conference on the Theory and Applications of Cryptology and Information Security. Proceedings, Singapore, Nov. 14-18, 1999, pp. 135-149.

* cited by examiner

COMPUTING METHOD FOR ELLIPTIC CURVE CRYPTOGRAPHY

FIELD

The invention relates to a cryptographic method employed between two entities exchanging information over a non-secure communication channel, for example a cable or radio network, the method assuring the confidentiality and the integrity of information transfer between the two entities. The invention relates more particularly to an improvement to cryptosystems employing calculations on an elliptic curve. The improvement mainly reduces the calculation time.

BACKGROUND

The Diffie-Hellmann key exchange cryptographic protocol is used to exchange keys securely between two entities. Using it entails employing a group in the mathematical sense of the term. A group that can be used is constituted by an elliptic curve of the following type:

$$y^2 + xy = x^3 + \alpha x^2 + \beta$$

It is known that if P=(x,y) is on the elliptic curve E, it is possible to define a "product" or "scalar multiplication" of the point P of E by an integer m. This operation is defined as follows:

$$[m]P = P + P + \ldots + P(m \text{ times})$$

Doubling a chosen point P on this kind of elliptic curve in a Diffie-Hellmann key exchange algorithm is known in the art. This operation is known as "point doubling" and is part of an iterative double-and-add process. Any such doubling takes time.

The slowest part of the Diffie-Hellmann key exchange protocol is multiplying an unknown point on the curve by a random scalar. Only elliptic curves defined on a body of characteristic-two are considered here; this is a widely adopted implementation choice, because addition within a body of this kind corresponds to the "exclusive—or" operation.

It is known in the art that multiplication by a scalar can be accelerated for curves defined on a body of low cardinality by using the Frobenius morphism. The curves can be chosen so that none of the known attacks applies to them. However, it is obviously preferable, at least in principle, to be able to choose the curve to be used from a class of curves that is as general as possible. The fastest version of the method in accordance with the invention is applied to half the elliptic curves. Moreover, from a cryptographic point of view, that half is the best half. Before the theory of the method is described, the basic concepts are reviewed.

For simplicity, consider the elliptic curve (E) that can be represented geometrically and is defined for the set R of real numbers by the equation $y^2 + y = x^3 - x^2$ shown in FIG. 1, in which figure a horizontal line represents an integer number m, a vertical line represents an integer number n and each intersection of horizontal and vertical lines represents the integer coordinate pair (m, n).

(E) passes through a finite number of points with integer coordinates and any secant at (E) originating from any such point intersects (E) at two points, which may be coincident (in the case of tangents to the curve).

The addition operation applied to any two of these points A and B is defined as follows: let $B_1$ be the point at which the straight line segment (AB) intersects (E); the vertical through $B_1$ intersects (E) at C=A+B.

In the special case where (AB') is tangential to (E), C' is the required sum.

The "intersection of all verticals" point O is referred to as the point at infinity of (E) and is the neutral element of the addition defined in this way since, by applying the geometrical construction which defines the addition:

$$A + O = O + A = A$$

The doubling of A, which is denoted [2]A and defined as: A+A, is therefore the point B', the straight line segment (Ax) being tangential to (E) at A.

By applying the addition of A construction to the point B', the point [3]A is obtained, and so on: this is the definition of the product [n]A of a point by an integer.

The present invention in fact relates to a family of elliptic curves which cannot be represented geometrically but are defined as follows:

Let n be a given integer, $F_{2^n}$ the body of $2^n$ elements, and $\overline{F_{2^n}}$ its algebraic closure. Let O be the point at infinity. The non-supersingular elliptic curve E defined at $F_{2^n}$ is:

$$E = \{(x,y) \in \overline{F_{2^n}} \times \overline{F_{2^n}} | y^2 + xy = x^3 + \alpha x^2 + \beta\} \cup \{O\} \alpha, \beta \in F_{2^n}, \beta \neq 0$$

The elements of E are usually referred to as "points". It is well known in the art that E can be given an abelian group structure by taking the point at infinity as a neutral element. Hereinafter, the finite subgroup of rational points of E is considered, and is defined by:

$$E(F_{2^n}) = \{(x,y) \in F_{2^n} \times F_{2^n} | y^2 + xy = x^3 + \alpha x^2 + \beta\} \cup \{O\} \alpha, \beta \in F_{2^n}, \beta \neq 0$$

where N is the set of natural integers; for all m∈N, the "multiplication by m" application in E is defined by:

$$[m]: E \to E$$

$$P \to P + \ldots + P(m \text{ times}) \text{ and } \forall P \in E: [O]P = O$$

E[m] is the kernel of the application. The points of the group E[m] are called the m-torsion points of E. The group structure of the m-torsion points is well known in the art.

In the situation in which m is a power of 2:

$$\forall k \in N: E[2^k] \cong Z/2^k Z$$

where Z is the set of relative integers.

Because $E(F_{2^n})$ is a finite sub-group of E, there exists k'≥1 such that $E(2^k)$ is contained in $E(F_{2^n})$ if and only if k≤k'. For the elliptic curves E for which k'=1, the structure of $E(F_{2^n})$ is:

$$E(F_{2^n}) = G \times \{O, T_2\}$$

where G is an odd order group and $T_2$ designates the unique second order point of E. A curve of this kind is said to have a minimal two-torsion.

SUMMARY

It is now possible to explain the object of the invention. Doubling is not injective when it is defined on E or $E(F_{2^n})$, because its kernel is: $E[2] = \{O, T_2\}$.

Moreover, if the domain for defining doubling is reduced to an odd order sub-group $G \subset E(F_{2^n})$ doubling becomes bijective.

As a result doubling allows an inverse application to the sub-group that is referred to hereinafter, as halving:

$$[\tfrac{1}{2}]: G \to G$$

$$P \to Q \text{ such that: } [2]Q = P$$

[½] P is the point of G to which the doubling application makes the point P correspond. For all k≧1:

$$\left[\frac{1}{2^k}\right] = \left[\frac{1}{2}\right] \circ \left[\frac{1}{2}\right] \circ \ldots \circ \left[\frac{1}{2}\right]$$

represents k compositions of the halving application with itself.

Generally speaking, the invention therefore provides a cryptographic method employed between two entities exchanging information via a non-secure communication channel, the method including a step of multiplying an odd order point of a non-supersingular elliptic curve by an integer, characterized in that, for exchanging information via the non-secure communication channel, the above step includes addition and halving of points of said elliptic curve, the addition of points is an operation known in the art, the halving of a point P is defined as the unique odd order point D such that [2]D=P, $$\left[\frac{1}{2}\right]$$

denotes the halving operation and $$\left[\frac{1}{2}\right]P$$

denotes the point D.

The halving application is beneficial for the scalar multiplication of a point on an elliptic curve for the following reason: if affine coordinates are used, it is possible to replace all doublings of a point of a scalar multiplication by halvings of a point.

The halving of a point is much faster to calculate that its doubling. From a cryptographic point of view it is good to be able to choose from the greatest possible number of curves and a curve is usually used for which the two-torsion of $E(F_{2^n})$ is minimal or isomorphic to $Z/4Z$. For a given curve $F_{2^n}$ the minimal two-torsion elliptic curves constitute exactly half of the set of elliptic curves defined on $F_{2^n}$. This is why, although it is not totally general, the fastest version of the method described applies to a good proportion of the curves in interest in cryptography. It can also be applied when the elements of the body are represented in a normal basis. In the case of a polynomial basis, the memory space required is of the order of $O(n^2)$ bits.

BRIEF DESCRIPTION OF THE DRAWINGS

Some examples are given hereinafter, with reference to the accompanying drawings, in which.

DETAILED DESCRIPTION

Figure 1:
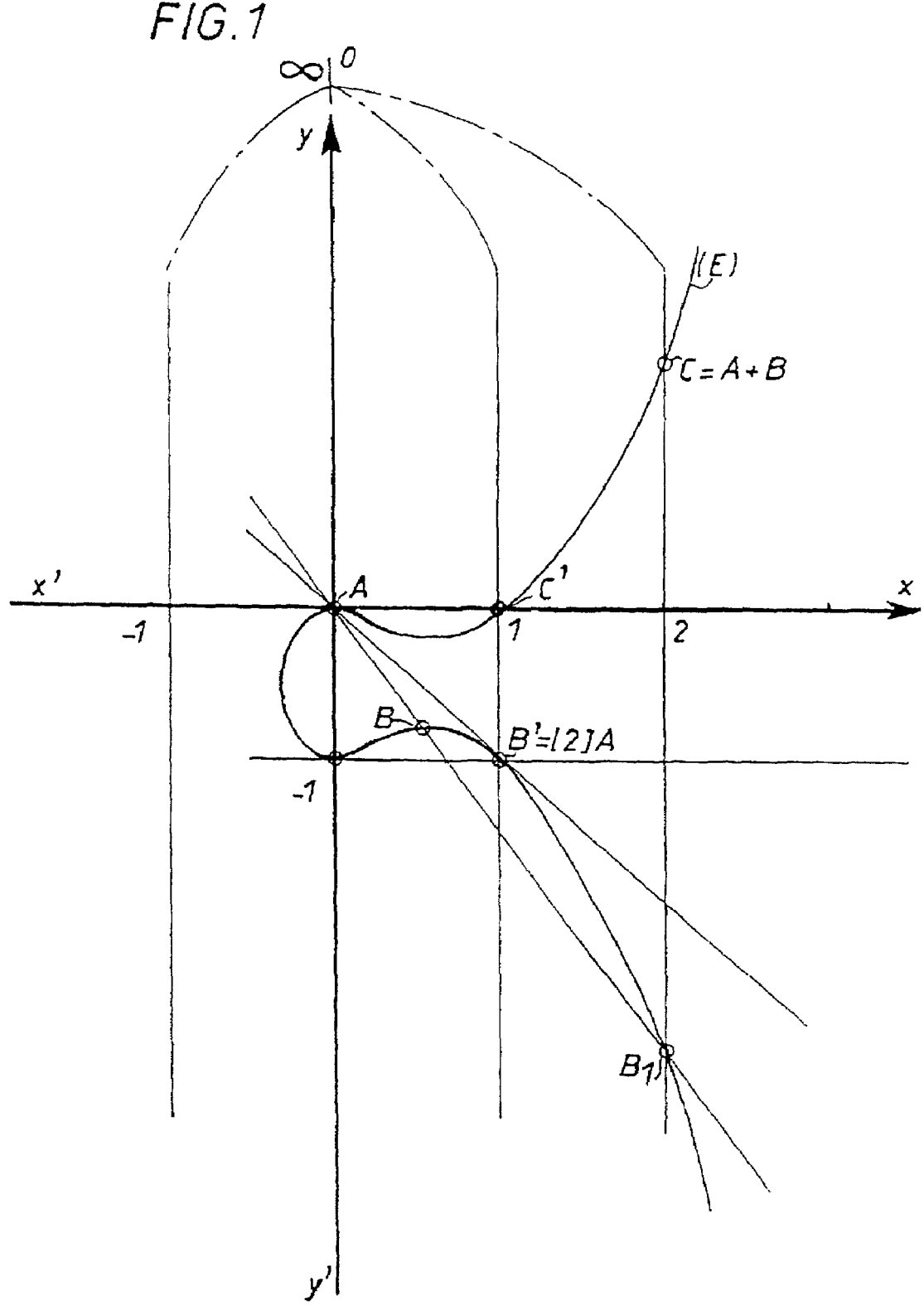
FIG. 1 is a graph showing a very particular elliptic curve that can be represented geometrically and is used hereinafter to explain elementary operations employed in the context of the invention.

We will show how to calculate [½] P∈G from P∈G. We will then show how to replace the doublings of points by halvings to execute a multiplication by a scalar.

We will use the usual affine representation of a point: $P=(x,y)$ and the representation: $(x,\lambda_p)$ with $\lambda_p=x+y/x$.

We derive $y=x(x+\lambda_p)$ which uses only one multiplication, from the second representation.

By proceeding in this way, to multiply a point by a scalar, we save on multiplications by calculating intermediate results using the representation $(x, \lambda_p)$ and the coordinate of the affine representation is determined only at the end of the calculation.

A point P is halved in the following manner:

Calculate [½] P from P. For this consider the two points of E:

$$P=(x,y)=(x,x(x+\lambda_p)),$$

and $Q=(u,v)=(u,u(u+\lambda_Q))$ such that: [2]Q=P.

The formulas for doubling known in the art yield:

$$\lambda_Q=u+v/u, \quad (1)$$

$$x=\lambda_Q^2+\lambda_Q+\alpha, \quad (2) \text{ and}$$

$$y=(x+u)\lambda_Q+x+v. \quad (3)$$

Multiplying (1) by u and inserting the value of v obtained in this way in (3), the above system becomes:

$$v=u(u+\lambda_Q),$$

$$\lambda_Q^2+\lambda_Q=\alpha+x, \text{ and}$$

$$y=(x+u)\lambda_Q+x+u^2+u\lambda_Q=u^2+x(\lambda_Q+1)$$

or, since $y=x(x+\lambda_p)$:

$$\lambda_Q^2+\lambda_Q=\alpha+x, \quad (i)$$

$$u^2=x(\lambda_Q+1)+y=(\lambda_Q+\lambda_p+x+1), \quad (ii)$$

and $$v=u(u+\lambda_Q) \quad (iii).$$

Starting from $P=(x,y)=(x, x(x+\lambda_p))$ in affine coordinates or in the $(x, \lambda_p)$ representation, the above system of equations determines the following two types:

$$[\frac{1}{2}]P\in G \text{ and } [1[/2]P+T_2\in E(F_{2^n})\backslash G$$

which give P by doubling. The following property enables it to be distinguished.

Let E be a minimal two-torsion elliptic curve and P∈E $(F_{2^n})=G\times\{O, T_2\}$ one of its odd order elements. Let $Q\in\{[\frac{1}{2}]P, [\frac{1}{2}]P+T_2\}$ and let $Q_1$ be one of the two points of E such that $[2]Q_1=Q$.

We have the necessary and sufficient condition:

$$Q+[\frac{1}{2}]P \Leftrightarrow Q_1\in E(F_{2^n}) \quad (a)$$

We deduce from this that it is possible to check if Q=[½] P by applying the formulas (i), (ii) and (iii) to Q and verifying if one of the points obtained belongs to $E(F_{2^n})$.

We can extend this process to an elliptic curve $E(F_{2^n})=G\times E[2^k]$ that is arbitrary by applying the formulas (i), (ii) and (iii) k times: the first time to Q, to obtain a point $Q_1$ such that $[2]Q_1=Q$; the ith time to $Q_{i-1}$ to obtain a point $Q_i$ such that $[2]Q_i=Q_{i-1}$. The resultant point $Q_k$ will be of the form:

$$\left[\frac{1}{2^{k+1}}\right]P+T_{2^{k+1}}$$

if and only if $Q=[\frac{1}{2}]P+T_2$ and will be of the form:

$$\left[\frac{1}{2^{k+1}}\right]P+T_{2^i}$$

with $0\leq i\leq k$ if and only if $Q=[\frac{1}{2}]P$. We therefore have the necessary and sufficient condition:

$Q=[\frac{1}{2}]P \Leftrightarrow Q_K \in E(F_{2^n})$

This process is evidently lengthy if k is large.

The above equation (a) shows that we can determine whether $Q=[\frac{1}{2}]P$ or $Q=[\frac{1}{2}]P+T_2$ by examining if the coordinates of $Q_1$ belong to $F_{2^n}$ or to a super-body of $F_{2^n}$. As $Q_1$ is determined by the equations (i), (ii) and (iii), we have to study the operations used in solving these equations, which are not internal to the body but have their result on a super-body of $F_{2^n}$. The only possible instance is that of solving the second degree equation (i): we must also calculate a square root to calculate the first coordinate of $Q_1$, but in characteristic-two finding the square root is an operation internal to the body. Thus:

$Q=(u,v)=[\frac{1}{2}]P \Leftrightarrow \exists \lambda \in F_{2^n}:\lambda^2+\lambda=\alpha+u$ Because finding the square root is internal to the body, this necessary and sufficient condition can also be written:

$Q=(u,v)=[\frac{1}{2}]P \Leftrightarrow \exists \lambda \in F_{2^n}:\lambda^2+\lambda=\alpha^2+u^2$ The preceding relation is used to optimize the algorithm referred to below in instances where the square root calculation time is not negligible.

Figure 3:
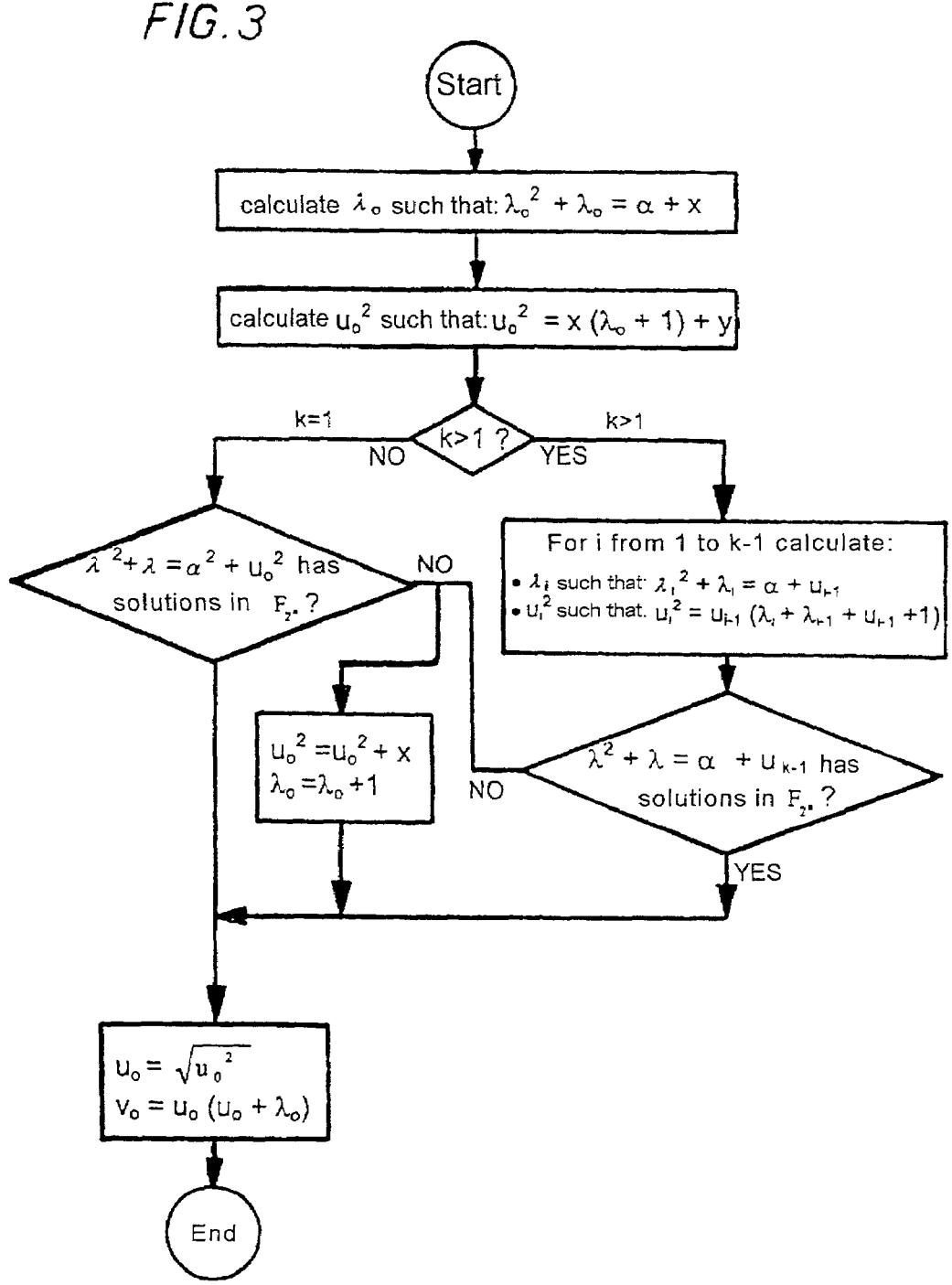
FIGS. 3 to 6 are flowcharts explaining some applications conforming to the invention.
Figure 4:
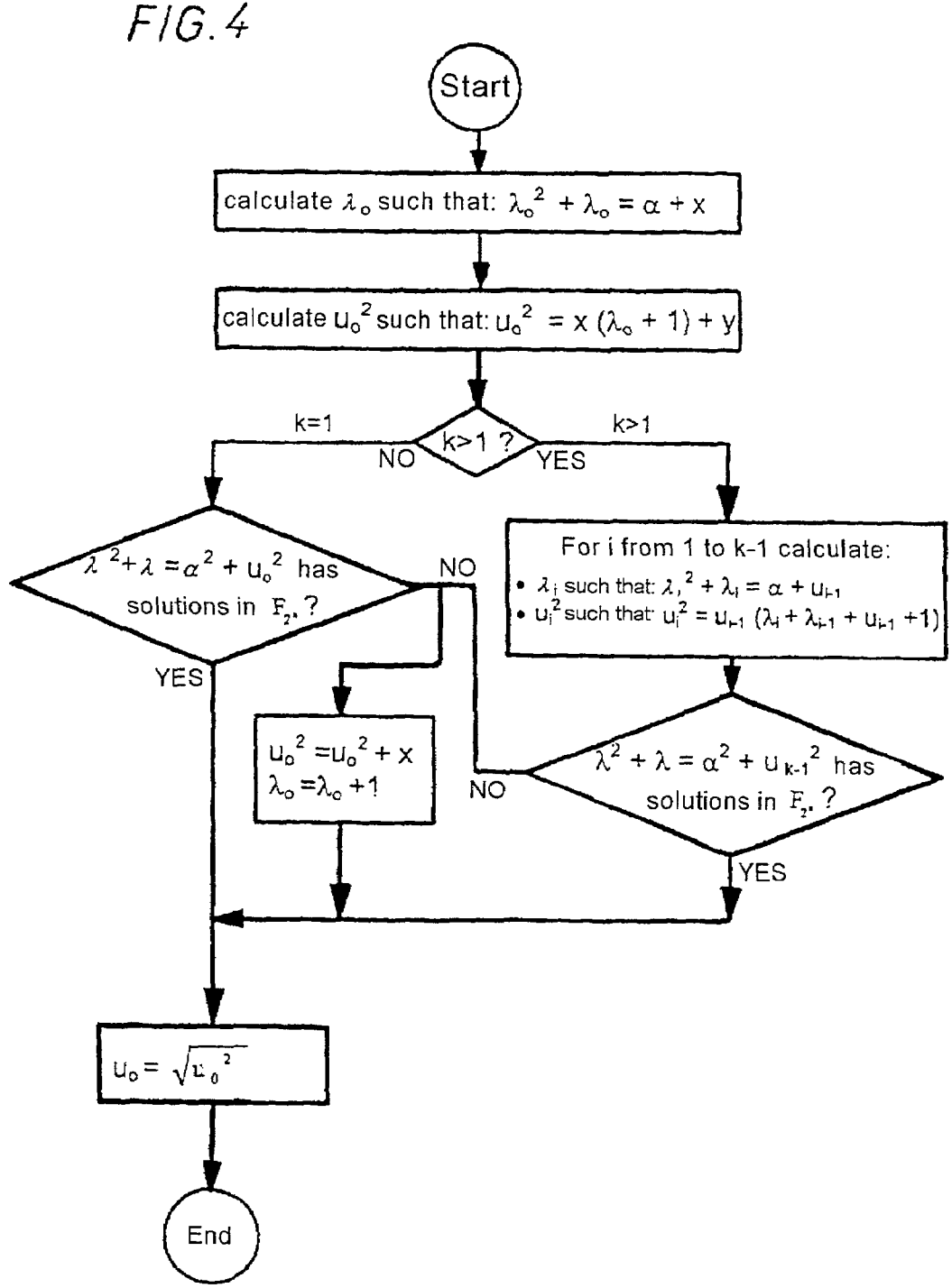

For $P \in G$, the two solutions of (i) are $\lambda_{[\frac{1}{2}]P}$ and $\lambda_{[\frac{1}{2}]P}+1$ and we deduce from (ii) that the first coordinates of the associated points are u and $(u+\sqrt{x})$. We can therefore deduce an algorithm for calculating $[\frac{1}{2}]P$ in the following manner:

If $F_{2^n}$ is a finite body of $2^n$ elements, $E(F_{2^n})$ is the sub-group of an elliptic curve E defined by:

$E(F_{2^n})=\{(x,y)\in F_{2^n}\times F_{2^n}|y^2+xy=x^3+\alpha x^2+\beta\}\cup\{O\}\alpha$, $\beta \in F_{2^n}, \beta \neq O$, and $E[2^k]$ is the set of points P of said elliptic curve such that P added $2^k$ times to itself gives the neutral element O when k is an integer greater than or equal to 1 then a point $P=(x,y)$ of said elliptic curve yields by said halving the point $$\left[\frac{1}{2}\right]P=(u_0, v_0)$$

of said elliptic curve, obtained by effecting the following operations illustrated by the FIG. 3 flowchart:
seek a first value $\lambda_o$ such that $\lambda_o^2+\lambda_o=\alpha+x$
calculate a second value $u_o^2$ such that $u_o^2=x(\lambda_o+1)+y$
if k has the value 1, check if the equation: $\lambda^2+\lambda=\alpha^2+u_o^2$ has solutions in $F_{2^n}$,
if so, calculate said halving as follows:

$u_o=\sqrt{u_o^2}$ $v_o=u_o(u_o+\lambda_o)$ and $$\left[\frac{1}{2}\right]P=(u_0, v_0)$$

if not, add x to said second value $u_o^2$ and 1 to said first value $\lambda_o$ and calculate said halving as in the directly preceding operation;
if k is greater than 1, perform the following iterative calculation:
seek a value $\lambda_i$ such that $\lambda_i^2+\lambda_i=\alpha+u_{i-1}$
then calculate the value $u^2_i$ such that $u^2_i=u_{i-1}(\lambda_i+\lambda_{i-1}+u_{i-1}+1)$
by incrementing i from i=1 until the value $u_{k-1}^2$ is obtained
check whether the equation $\lambda^2+\lambda=\alpha^2+u^2_{k-1}$ has solutions in $F_{2^n}$
if so, calculate said halving is as follows:

$u_o=\sqrt{u_o^2}$ $v_o=u_o(u_o+\lambda_o)$ and $$\left[\frac{1}{2}\right]P=(u_0, v_0)$$

if not, add x to the second value $u_o^2$ and 1 to said first value $\lambda_o$ to calculate said halving as in the preceding operation. If we choose to represent the point $$\left[\frac{1}{2}\right]P=(u_0, v_0)$$

of the elliptic curve by $(u_o, \lambda_o)$ with $\lambda_o=u_o+v_o/u_o$, then the algorithm conforms to the FIG. 4 flow chart:
seek a first value $\lambda_o$ such that $\lambda_o^2+\lambda_o=\alpha+x$
calculate a second value $u_o^2$ such that $u_o^2=x(\lambda_o+1)+y$,
if k has the value 1, check if the equation: $\lambda^2+\lambda_o=\alpha^2+u_o^2$ has solutions in $F_{2^n}$,
if so, calculate said halving as follows:

$u_o=\sqrt{u_o^2}$ and:

$$\left[\frac{1}{2}\right]P=(u_0, \lambda_0)$$

if not, add x to said second value $u_o^2$ and 1 to said first value $\lambda_o$ to calculate said halving as in the preceding operation;
if k is greater than 1 perform the following an iterative calculation:
seek a value $\lambda_i$ such that $\lambda_i^2+\lambda_i=\alpha+u_{i-1}$
then calculate the value $u_i^2$ such that $u_i^2=u_{i-1}(\lambda_i+\lambda_{i-1}+u_{i-1}+1)$ incrementing i from i=1 until the value $u^2_{k-1}$ is obtained
check if the equation $\lambda^2+\lambda=\alpha^2+u^2_{k-1}$ has solutions in $F_{2^n}$
if so, calculate said halving as well as follows:

$$u_o=\sqrt{u_o^2}$$

and $$\left[\frac{1}{2}\right]P=(u_0,\lambda_0)$$

if not, add x to said second value $u_o^2$ and 1 to said first value $\lambda_o$ to calculate said halving as in the preceding operation.

Figure 5:
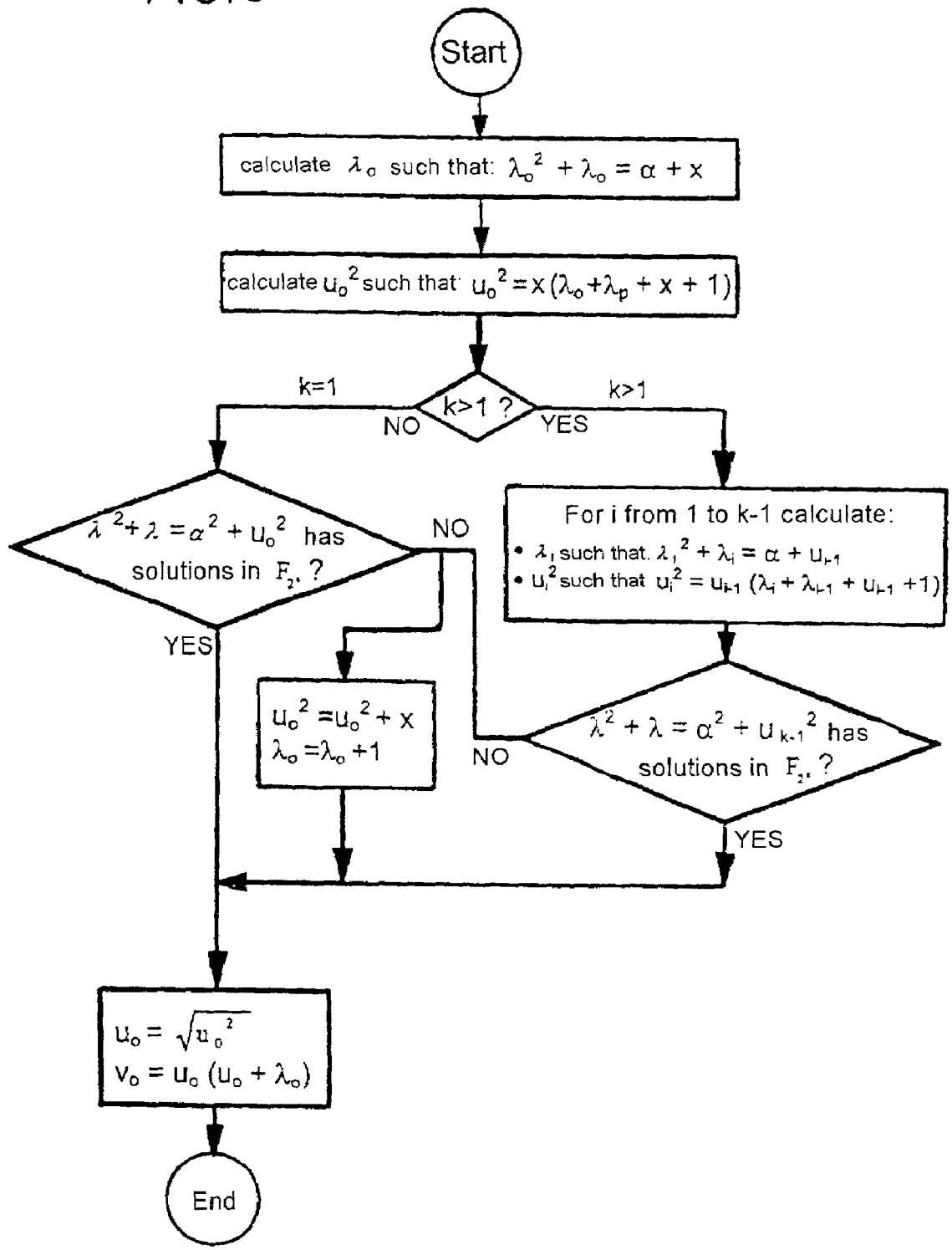
Figure 6:
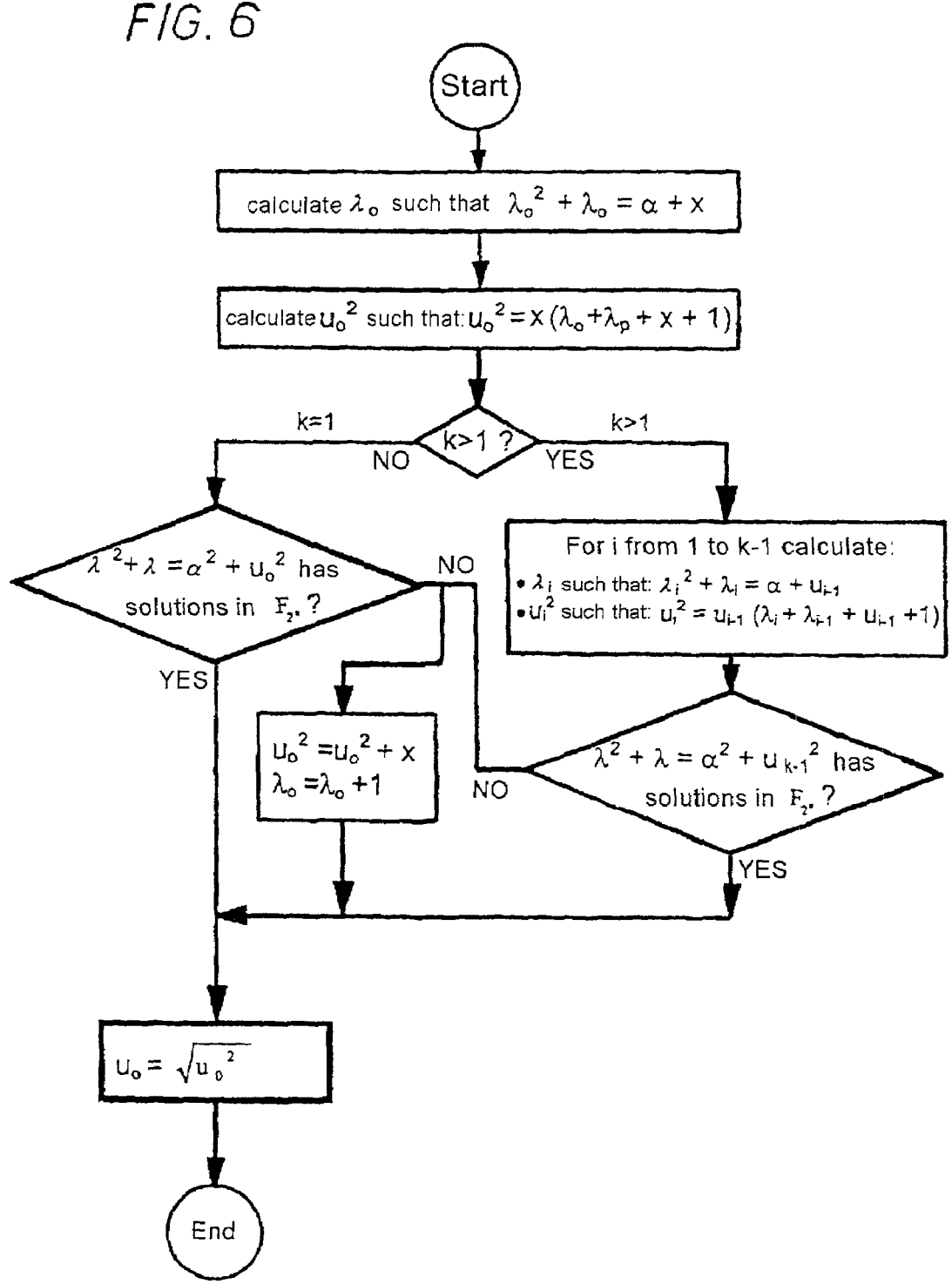

If we choose to represent the point P (x,y) by (x, $\lambda_p$) setting $\lambda_p$=x+y/x which gives by said halving the point $$\left[\frac{1}{2}\right]P=(u_0,v_0)$$

of said elliptic curve, then the algorithm conforms to the FIG. 5 flow chart:
seek a first value $\lambda_o$ such that $\lambda_o^2+\lambda_o=\alpha+x$
calculate a second value $u_o^2$ such that $u_o^2=x\,(\lambda_o+\lambda_p+x+1)$
if k has the value 1, check if the equation: $\lambda^2+\lambda=\alpha^2+u_o^2$ has solutions in $F_{2^n}$,
if so, calculate said halving as follows:

$$u_o=\sqrt{u_o^2}$$

$$v_o=u_o(u_o+\lambda_o)$$

and $$\left[\frac{1}{2}\right]P=(u_0,v_0)$$

if not, add x to said second value $u_o^2$ and 1 to said first value $\lambda_o$ to calculate said halving as in the preceding operation;
if k is greater than 1 perform the following an iterative calculation:
seek a value $\lambda_i$ such that $\lambda_i^2+\lambda_i=\alpha+u_{i-1}$
then calculate the value $u^2_i$ such that $u^2_i=u_{i-1}(\lambda_i+\lambda_{i-1}+u_{i-1}+1)$ incrementing i from i=1 until the value $u^2_{k-1}$ is obtained
check if the equation $\lambda^2+\lambda=a^2+u^2_{k-1}$ has solutions in $F_{2^n}$
if so, calculate said halving as well as follows:

$$u_o=\sqrt{u_o^2}$$

$$v_o=u_o(u_o+\lambda_o)$$

and $$\left[\frac{1}{2}\right]P=(u_0,v_0)$$

if not, add x to said second value $u_o^2$ and 1 to said first value $\lambda_o$ to calculate said halving as in the preceding operation.
Finally, if we choose to represent the point P=(x,y) by (x, $\lambda_p$) with $\lambda_p$=x+y/x which gives by said halving the point $$\left[\frac{1}{2}\right]P=(u_0,v_0)$$

of the elliptic curve represented by ($u_o$, $\lambda_o$) with $\lambda_o=u_o+v_o/u_o$
then the algorithm conforms to the FIG. 6 algorithm:
seek a first value $\lambda_o$ such that $\lambda_o^2+\lambda_o=\alpha+x$
calculate a second value $u_o^2$ such that $u_o^2=x\,(\lambda_o+\lambda_p+x+1)$,
if k has the value 1 check if the equation $\lambda^2+\lambda=\alpha^2+u_o^2$ has solutions in $F_{2^n}$,
if so, calculate said halving as follows:

$$u_o=\sqrt{u_o^2}$$

and $$\left[\frac{1}{2}\right]P=(u_0,\lambda_0)$$

if not, add x to said second value $u_o^2$ and 1 to said first value $\lambda_o$ to calculate said halving as in the preceding operation;
if k is greater than 1 perform the following iterative calculation:
seek a value $\lambda_i$ such that $\lambda_i^2+\lambda_i=\alpha+u_{i-1}$
then calculate the value $u^2_i$, such that $u^2_i=u_{i-1}(\lambda_i+\lambda_{i-1}+u_{i-1}+1)$ incrementing i from i=1 until the value $u^2_{k-1}$ is obtained
check if the equation $\lambda^2+\lambda=\alpha^2+u^2_{k-1}$ has solutions in $F_{2^n}$
if so, calculate said halving as follows:

$$u_o=\sqrt{u_o^2}$$

and $$\left[\frac{1}{2}\right]P=(u_0,\lambda_0)$$

if not, add x to said second value $u_o^2$ and 1 to said first value $\lambda_o$ to calculate said halving as in the preceding operation.

We next describe how to perform the check, solve the second degree equation and calculate the square root in the algorithm for halving a point rapidly. We consider the normal basis and the polynomial basis.

The normal basis results are known in the art. We can consider $F_{2^n}$ as the n-dimensional vectorial space on $F_2$. In a normal basis, an element of the body is represented by:

$$x=\sum_{i=0}^{n-1}x_i\beta^{2^i}\quad x_i\in\{0,1\}$$

where $\beta\in F_{2^n}$ is chosen such that: $\{\beta,\beta^2,\ldots,\beta^{2^{n-1}}\}$ is a basis $F_{2^n}$. In a normal basis, the square root is calculated by a left circular shift and squaring is effected by a right circular shift. The corresponding calculation times are therefore negligible.

If the second degree equation: $\lambda^2+\lambda=x$ has its solutions in $F_{2^n}$, a solution is then given by:

$$\lambda=\sum_{i=1}^{n-1}\lambda_i\beta^{2^i}\quad\text{with:}\quad\lambda_i=\sum_{k=1}^{i}x_i\quad 1\leq i\leq n-1$$

The time to calculate $\lambda$ is negligible compared to the time to calculate a multiplication of an inversion in the body. As the time to calculate a solution of the second degree equation is negligible, the check can be effected as follows: calculate a candidate $\lambda$ from x and check if $\lambda^2+\lambda=x$. If not, the equation has no solution in $F_{2^n}$.

In a polynomial basis, the following representation is used:

$$x = \sum_{i=0}^{n-1} x_i T^i$$

with $x_i \in \{0,1\}$. The square root of x can be calculated by storing the element $\sqrt{T}$ if we note that:

in a body of characteristic-two, the square root is a morphism of the body, $$\sqrt{\sum_{i \text{ even}} x_i T^i} = \sum_{i \text{ even}} x_i T^{\frac{i}{2}}$$

Grouping in x the even and odd powers of T and taking the square root, this becomes:

$$\sqrt{x} = \sum_{i \text{ even}} x_i T^{\frac{i}{2}} + \sqrt{T} \sum_{i \text{ odd}} x_i T^{\frac{i-1}{2}}$$

so that, to calculate a square root, it is sufficient to "reduce" two vectors by half and therefore to execute a multiplication of a previously calculated value by an element of length n/2. This is why the time to calculate a square root in a polynomial basis is equivalent to half the time to calculate a multiplication in the body.

For the check and for solving the second degree equation, we consider $F_{2^n}$ as a n-dimensional vectorial space on $F_2$. The application F defined as follows:

$$F : F_{2^n} \to F_{2^n}$$
$$\lambda \to \lambda^2 + \lambda$$

is then a linear kernel operator $\{0, 1\}$

For a given x, the equation $\lambda^2 + \lambda = x$ has its solutions in $F_{2^n}$ if and only if the vector x is in the image of F. Im(F) is an (n−1)-dimensional sub-space of $F_{2^n}$. For a given basis of $F_{2^n}$ and the corresponding scalar product there exists a single non-trivial vector orthogonal to all the vectors of Im(F). Let w be that vector. We have:

$$\exists \lambda \in F_{2^n} : \lambda^2 + \lambda = x \Leftrightarrow x \cdot w = 0$$

Accordingly, the check can be performed by adding the components of x to which components of w equal to 1 correspond. The time to perform this check is negligible.

To solve the second degree equation: $F(\lambda) = \lambda^2 + \lambda = x$ in a polynomial basis, we propose a simple and direct method which imposes the storage of an n×n matrix. For this we look for a linear operator G such that:

$$\forall x \in Im(F) : F(G(x)) = (G(x))^2 + G(x) = x$$

Let $\gamma \in F_{2^n}$ be a vector such that $\gamma \notin Im(F)$ and define G as follows:

$$G = \tilde{F}^{-1} \text{ with } \tilde{F}(T^i) = \begin{cases} \gamma & \text{if: } i = 0 \\ F(T^i) & \text{if: } 1 \leq i \leq n-1 \end{cases}$$

Given that $$x = \sum_{i=1}^{n-1} x_i F(T^i) \in Im(F)$$

then G(x) is a solution of the second degree equation. One implementation consists of precalculating the matrix representing G in the basis $\{1, T, \ldots, T^{n-1}\}$. In characteristic-two, the multiplication of a matrix by a vector is reduced to adding columns of the matrix to which a component of the vector equal to 1 corresponds. It follows that this method of solving a second degree equation consumes on average n/2 additions in the body $F_{2^n}$.

Application of the principles explained above to scalar multiplication is described below.

Let $P \in E(F_{2^n})$ be a point of odd order r, c a random integer and m the integer part of $\log_2(r)$. We calculate the product [c]P of a point by a scalar using the application for halving a point.

We show that:

For any integer c, there is a rational number of the form:

$$\sum_{i=0}^{m} \frac{c_i}{2^i} \quad c_i \in \{0, 1\}$$

such that:

$$c \equiv \sum_{i=0}^{m} \frac{c_i}{2^i} \pmod{r}$$

Let <P> be the cyclic group generated by P. Because of the ring isomorphism:

$$P \approx z/rz$$
$$[k]P \to k$$

The scalar multiplication can be calculated as follows:

$$[c]P = \sum_{i=0}^{m} \left[\frac{c_i}{2}\right]P$$

using halving and addition. We can use the double-and-add algorithm well known in the art for these calculations. For that it is sufficient to replace doubling by halving in the algorithm. It is necessary to execute $\log_2(r)$ halvings and, on average, ½ $\log_2(r)$ additions. There are improved versions of the double-and-add algorithm which require only ⅓ $\log_2(r)$ additions on average.

Consequently, a scalar multiplication using a halving as defined above is obtained by means of the following operations:

if said scalar of the multiplication is denoted S, choose m+1 values

So ... Sm∈{0,1} to define S as follows:

$$S = \sum_{i=0}^{m} S_i \left(\frac{r+1}{2}\right)^i$$

r being the aforementioned odd order and m being the single integer between $\log_2(r)-1$ and $\log_2(r)$, calculate the scalar multiplication [S]P of a point P of said elliptic curve by the scalar S by applying an algorithm consisting of determining the series of points ($Q_{m+1}$, $Q_m$ ..., $Q_i$ ..., $Q_o$) of said elliptic curve E such that:

$Q_{m+1}$=O (neutral element)

$$Q_i = [S_i]P + \left[\frac{1}{2}\right]Q_{i+1}$$

with o≦i≦m calculate the last point $Q_o$ of said series giving the result result $$Q = \left[\frac{1}{2}\right]Q_i,$$

we use the following algorithm, which is a slightly modified version of the standard algorithm:

Input: P=(x,y) in affine coordinates and Q=(u, u(u+$\lambda_Q$)) represented by (u, $\lambda_Q$)

Output: P+Q=(s, t) in affine coordinates algorithm: [S] P of said scalar multiplication.

To add the initial point P to an intermediate

1. Calculate: $\lambda = \dfrac{y + u(u + \lambda_Q)}{x + u}$
2. Calculate: $s = \lambda^2 + \lambda + a + x + u$
3. Calculate: $t = (s + x)\lambda + s + y$
4. Result: $(s, t)$ This algorithm uses one inversion, three multiplications and one square root.

Much time is saved by replacing doubling by halving. In affine coordinates, doubling and addition both require: one inversion, two multiplications and a square root. If the scalar of the multiplication by a scalar is represented by a bit vector of length m and of k non-zero components, scalar multiplication requires:

TABLE 1

| operation | double and add | halve and add |
|---|---|---|
| inversions | m + k | k |
| multiplications | 2m + 2k | m + 3k |
| squarings | m + k | k |
| solutions of $\lambda^2 + \lambda = a + x$ | 0 | m |
| square roots | 0 | m |
| checks | 0 | m |

Thus using halving saves m inversions, m–k multiplications and m squarings at the cost of adding m second degree solutions, m square roots and m checks.

In a polynomial basis, an execution time improvement of around 50% can be obtained.

In a normal basis, we estimate the time to calculate the square root, perform the check and solve the second degree equation negligible compared to the time to calculate a multiplication or an inversion. Assuming further that the time to calculate an inversion is equivalent to the time to calculate three multiplications, we arrive at an execution time improvement of 55%.

Figure 2:
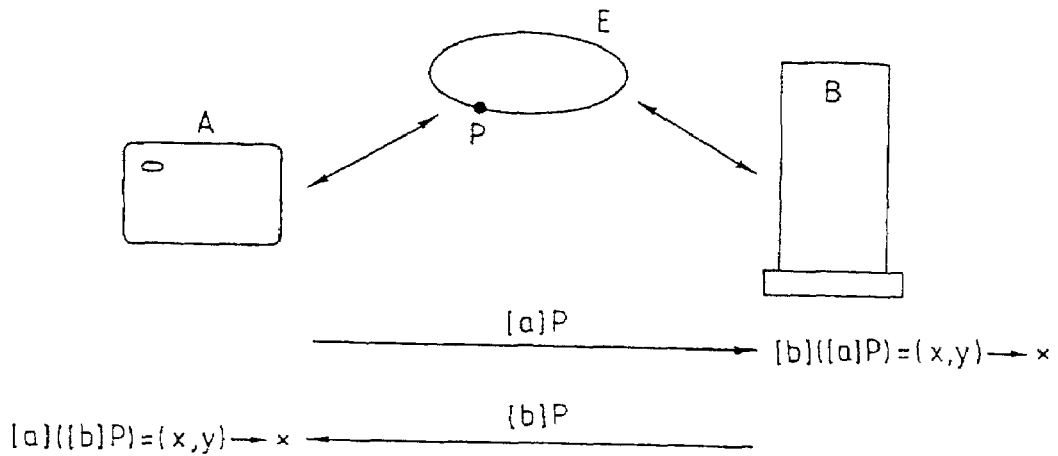
FIG. 2 is a diagram showing exchanges of information in accordance with the invention between two entities.

FIG. 2 is a diagram showing one possible application of the algorithms described above between two entities A and B exchanging information over a non-secure communication channel. Said communication channel can consist of simple electrical connections established between the two entities for the time of a transaction. It can also include a radio and/or optical telecommunication network. In this instance the entity A is a microcircuit card and the entity B is a server. Once connected to each other via said communication channel, the two entities apply a common key construction protocol. For this purpose:

entity A has a secret key a entity B has a secret key b

They must generate a secret key x known only to them from a public key consisting of a point P of odd order r of a chosen non-supersingular elliptic curve E.

The protocol employed is a Diffie-Hellman protocol, substituting for the usual "multiplication-by-two" referred to as the doubling operation in accordance with the invention described above and referred to as "halving".

The algorithm for this is as follows:

the first entity (for example A) calculates the scalar multiplication [a]P and sends the result point to the second entity, the second entity (B) calculates the scalar multiplication [b]P and sends the result point to the first entity, the two entities respectively calculate a common point (C)=(x,y) of said elliptic curve (E) by respectively effecting the scalar multiplications [a]([b]P) and [b]([a]P), both equal to [a.b]P, and the two entities choose as their common key the coordinate x of said common point (C) obtained by said scalar multiplication [a.b]P, at least one of the preceding scalar multiplications, and preferably all of them, being effected by means of predefined halvings.

Figure 7:
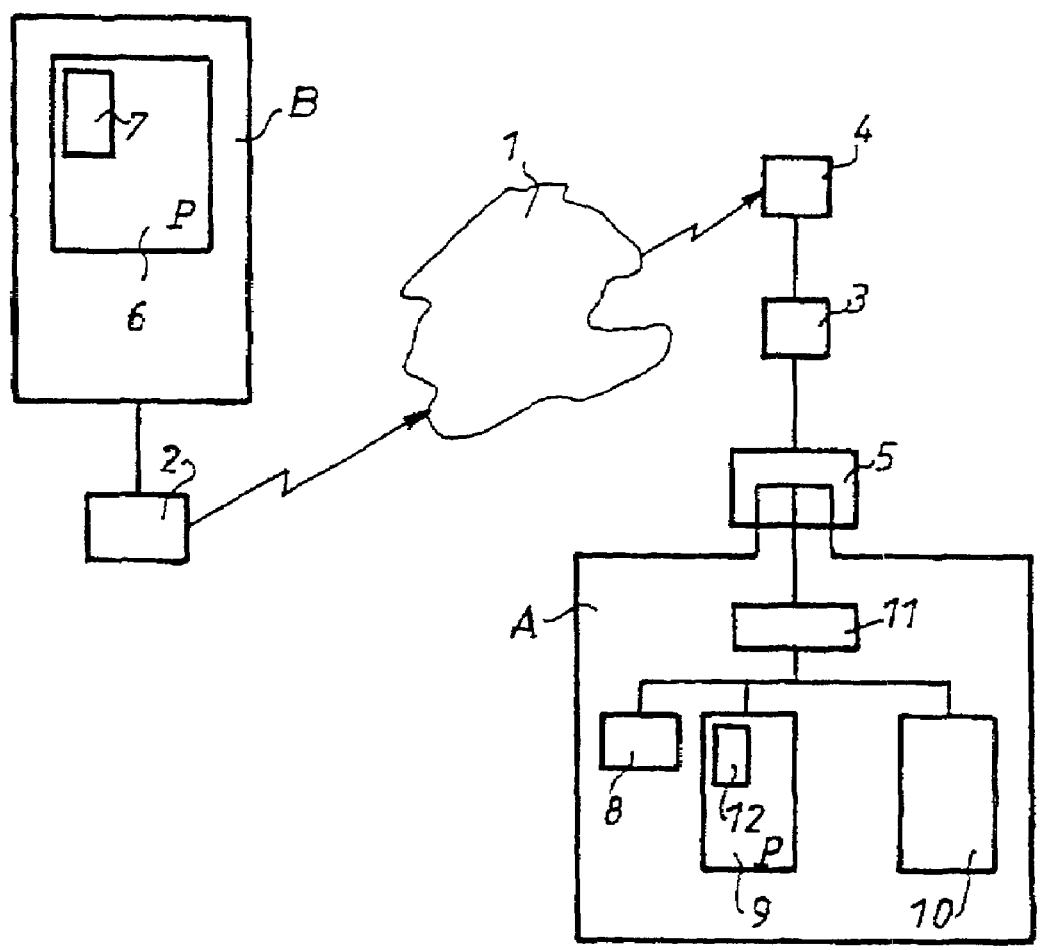
FIG. 7 is a block diagram of another system for exchanging information between two entities A and B which can employ a cryptographic method according to the invention.

To give a more precise example of this, FIG. 7 shows a server B connected to a communication network 1 via a communication interface 2, for example a modem interface. Similarly, a calculation station 3 is connected to the network 1 via a communication interface 4. The station 3 is equipped with a microcircuit card reader 5 into which the microcircuit card A is inserted.

The random access memory 6 of the server B contains a program 7 capable of executing cryptographic calculations on elliptic curves and in particular the product of a point by a scalar and the halving of a point.

The card A contain a central processor unit 11, a random access memory (RAM) 8, a read-only memory (ROM) 9 and an electrically erasable programmable read-only memory (EEPROM) 10. One of the memories 9 or 10 contains a program 12 capable of executing cryptographic calculations on elliptic curves and in particular the product of a point by a scalar and the halving of a point.

The two programs 7 and 12 have a common reference consisting of the same elliptic curve (E) and the same point P=($x_0$, $y_0$) of (E).

When A wishes to construct in parallel with B a common secret key for securing dialog with B, it chooses a scalar a and sends to B the product $Q=[a]P=(x_1, y_1)$ In response to this, B chooses a scalar $\underline{b}$ and sends back to A the product $R=[b]P=(x_2, y_2)$.

A then calculates the product $[a] R=[ab]p=(x, y)$ and B calculates the product $[b] Q=[ab]P=(x, y)$ and A and B adopt x as a common secret key.

These operations are represented in the table below. Those which are effected in the server B are indicated in the right-hand column and those which are effected in the card A are indicated in the left-hand column. The horizontal arrows symbolize transfers of information via the network 1.

TABLE 2

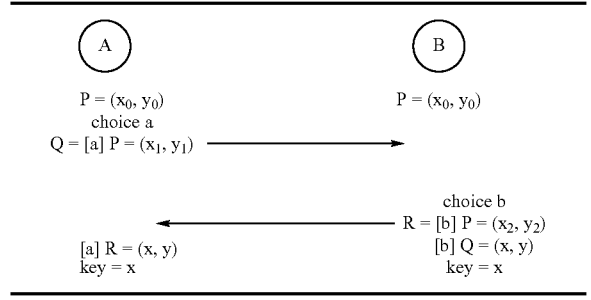

Another application of the invention applies between the two entities A and B in FIG. 7. It consists of a protocol for signing a message M transmitted between A and B via the non-secure channel, i.e. the network 1. The object of this protocol, the broad outlines of which are known in the art, is to make it certain that the message received by one entity was sent by the other entity.

To this end, the sending entity (for example A) has two permanent keys, namely a secret key a and a public key $Q=[a] P$, P being a point on an elliptic curve (E), and P and (E) being known to and agreed on by A and B. Another public key is the point P of odd order r of the chosen non-supersingular elliptic curve E. The operations effected entail halvings in the sense defined above.

In one example:

the first entity (A) holding said pair of permanent keys constructs a single-use pair of keys, one key (g) chosen arbitrarily and the other key [g] P resulting from scalar multiplication of said arbitrarily chosen key (g) by the public point P of said elliptic curve, the coordinates of the key ([g]P) being denoted (x,y) with $2 \leq g \leq r-2$, the first entity (A) converts the polynomial x of said single-use key $[g]P=(x,y)$ into an integer i whose binary value is represented by the sequence of binary coefficients of said polynomial x, said first entity (A) calculates a signature (c,d) of the message (M) as follows:

c=i modulo r $d=g^{-1}$ (M+ac) modulo r, said first entity sends said message (M) and said signature (c, d) to said second entity; on receiving it:

said second entity (B) checks if the elements of said signature (c,d) each belong to the range [1, r−1], if not, it declares the signature invalid and stops if so, said second entity (B) calculates three parameters:

$h=d^{-1}$ modulo r $h_1=Mh$ modulo r $h_2=ch$ modulo r said second entity calculates a point T of said elliptic curve by summing the scalar multiplications of the points P and Q by the last two parameters cited:

$T=[h_1]P+[h_2]Q$ if the resultant point T is the neutral element, said second entity declares the signature invalid and stops.

if it is not the neutral element, considering the point T with coordinates x' and y': $T=(x',y')$:

said second entity (B) converts the polynomial x' of that point into an integer i' whose binary value is represented by the sequence of binary coefficients of said polynomial x', said second entity (B) calculates c'=i' modulo r, and:

checks that c'=c: if so it validates said signature and if not it invalidates it, at least one of the scalar multiplication operations and preferably all of them being effected by means of the predefined halvings.

These operations can be represented by the table below in which the operations effected in the server B are indicated in the right-hand column and the operations effected in the card A are indicated in the left-hand column, the arrow between the two columns symbolizing the transfer of information via the network 1.

TABLE 3

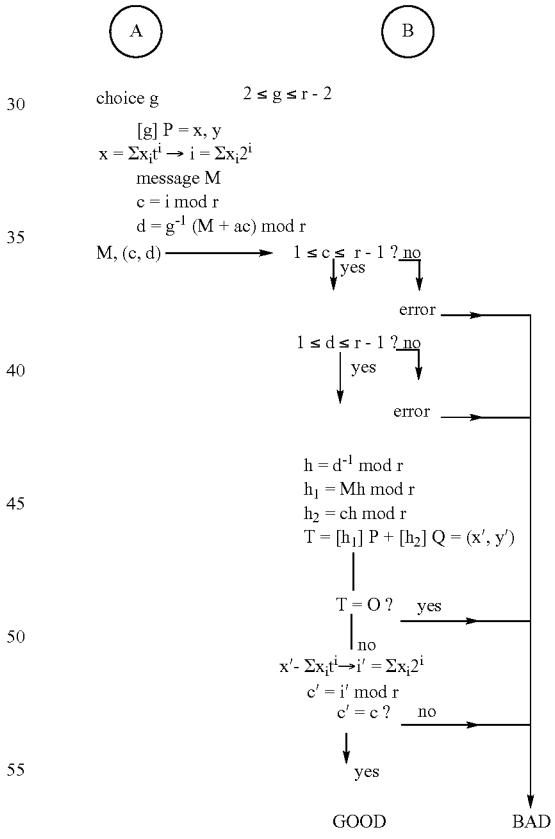

The invention claimed is:

1. A cryptographic method employed between two entities exchanging information via a non-secure communication channel, each of the two entities comprising a memory readable by a machine, tangibly embodying a program of instruction executable by the machine to perform the method, the method including a step of multiplying an odd order point of a non-supersingular elliptic curve by an integer, wherein, for exchanging information via the non-secure communication channel, the step of multiplying is performed by addition and halving operations of points of said elliptic curve, the halving of a point P is defined as the unique odd order point D such that [2]D=P, $$\left[\frac{1}{2}\right]P$$

denotes the point D.

2. A method according to claim 1, where $F_{2^n}$ is a finite body of $2^2$ elements, $E(F_{2^n})$ is the sub-group of an elliptic curve E defined by:

$$E(F_{2^n})=\{(x,y)\in F_{2^n}\times F_{2^n}|y^2+xy=x^3+\alpha x^2+\beta\}\cup\{O\}\alpha,$$
$$\beta\in F_{2^n}, \beta\neq 0$$

and $E[2^k]$ is the set of points P of said elliptic curve such that P added $2^k$ times to itself gives the neutral element O, where k is an integer greater than or equal to 1, wherein a point P=(x,y) of said elliptic curve gives by said halving the point $$\left[\frac{1}{2}\right]P = (u_o, v_o)$$

of said elliptic curve obtained by effecting the following operations:

(a) seek a first value $\lambda_o$ such that $\lambda_o^2+\lambda_o=\alpha+x$;
(b) calculate a second value $u_o^2$ such that $u_o^2=x(\lambda_o+1)+y$;
(c) if k has the value 1, check if the equation: $\lambda^2+\lambda=\alpha^2+u_o^2$ has solutions in $F_{2^n}$;
(d) if the check in step (c) is yes, calculate said halving as follows:

$$u_o=\sqrt{u_0^2},$$

$$v_o=u_o(u_o+\lambda_o)$$

and $$\left[\frac{1}{2}\right]P = (u_o, v_o);$$

(e) if not, add x to said second value $u_o^2$ and 1 to said first value $\lambda_o$ and calculate said halving as in step (d);
(f) if k is greater than 1, perform an iterative calculation as follows:
  (i) seek a value $\lambda_i$ such that $\lambda_i^2+\lambda_i=\alpha+u_{i-1}$; and
  (ii) then calculate the value $u_i^2$ such that $u_i^2=u_{i-1}(\lambda_i+\lambda_{i-1}+u_{i-1}+1)$ by incrementing i from i=1 until the value $u^2_{k-1}$ is obtained;
(g) check whether the equation $\lambda^2+\lambda=\alpha^2+u^2_{k-1}$ has solutions in $F_{2^n}$;
(h) if so, calculate said halving as follows:

$$u_o=\sqrt{u_0^2},$$

$$v_o=u_o(u_o+\lambda_o)$$

and $$\left[\frac{1}{2}\right]P = (u_o, v_o); \text{ and}$$

(i) if not, add x to the second value $u_o^2$ and 1 to said first value $\lambda_o$ and calculate said halving as in step (h).

3. A method according to claim 1, where $F_{2^n}$ is a finite body of $2^n$ elements, $E(F_{2^n})$ is the sub-group of an elliptic curve E defined by:

$$E(F_{2^n})=\{(x,y)\in F_{2^n}\times F_{2^n}|y^2+xy=x^3+\alpha x^2+\beta\}\cup\{O\}\alpha,$$
$$\beta\in F_{2^n}, \beta\neq 0$$

and $E[2^k]$ is the set of points P of said elliptic curve such that P added $2^k$ times to itself gives the neutral element O, where k is an integer greater than or equal to 1, wherein a point P=(x,y) of said elliptic curve gives by said halving the point $$\left[\frac{1}{2}\right]P = (u_o, \lambda_o)$$

of said elliptic curve,
with $\lambda_o=u_o+v_o/u_o$, obtained by effecting the following operations:

(a) seek a first value $\lambda_o$ such that $\lambda_o^2+\lambda_o=\alpha+x$;
(b) calculate a second value $u_o^2$ such that: $u_o^2=x(\lambda_o+1)+y$;
(c) if k has the value 1, check if the equation: $\lambda^2+\lambda=\alpha^2+u_o^2$ has solutions in $F_{2^n}$;
(d) if so, calculate said halving as follows:

$$u_o=\sqrt{u_0^2},$$

and $$\left[\frac{1}{2}\right]P = (u_o, \lambda_o);$$

(e) if not, add x to said second value $u_o^2$ and 1 to said first value $\lambda_o$ and calculate said halving as in step (d);
(f) if k is greater than 1, perform the following iterative calculation:
  (i) seek a value $\lambda_i$, such that $\lambda_i^2+\lambda_i=\alpha+u_{i-1}$; and
  (ii) then calculate the value $u_i^2$ such that $u_i^2=u_{i-1}(\lambda_i+\lambda_{i-1}+u_{i-1}+1)$ by incrementing i from i=1 until the value $u^2_{k-1}$ is obtained;
(g) check if the equation $\lambda^2+\lambda=\alpha^2+u^2_{k-1}$ has solutions in $F_{2^n}$;
(h) if so, calculate said halving as follows:

$$u_o=\sqrt{u_0^2}, \text{ and}$$

$$\left[\frac{1}{2}\right]P = (u_o, \lambda_o); \text{ and}$$

(i) if not, add x to said second value $u_o^2$ and 1 to said first value $\lambda_o$ to calculate said halving as in step (h).

4. A method according to claim 1, where $F_{2^n}$ is a finite body of $2^n$ elements, $E(F_{2^n})$ is the sub-group of an elliptic curve E defined by:

$$E(F_{2^n})=\{(x,y)\in F_{2^n}\times F_{2^n}|y^2+xy=x^3+\alpha x^2+\beta\}\cup\{O\}\alpha,$$
$$\beta\in F_{2^n}, \beta\neq 0$$

and $E[2^k]$ is the set of points P of said elliptic curve such that P added $2^k$ times to itself gives the neutral element O, where k is an integer greater than or equal to 1, wherein a point P=(x,y) of said elliptic curve represented by $(x,\lambda_p)$ with $\lambda_p=x+y/x$ gives by said halving the point $$\left[\frac{1}{2}\right]P = (u_o, v_o)$$

of said elliptic curve obtained by effecting the following operations:
(a) seek a first value $\lambda_o$ such that $\lambda_o^2 + \lambda_o = \alpha + x$;
(b) calculate a second value $u_o^2$ such that $u_o^2 = x \, (\lambda_o \lambda + \lambda_p + x + 1)$;
(c) if k has the value 1, check if the equation: $\lambda^2 + \lambda = \alpha^2 + u_o^2$ has solutions in $F_2^n$;
(d) if so, calculate said halving as follows:

$$u_o = \sqrt{u_o^2},$$

$$v_o = u_o(u_o + \lambda_o),$$

and $\left[\frac{1}{2}\right]P = (u_o, v_o)$;

(e) if not, add x to said second value $u_o^2$ and 1 to said first value $\lambda_o$ and calculate said halving as in step (d);
(f) if k is greater than 1, perform the following iterative calculation:
  (i) seek a value $\lambda_i$ such that $\lambda_i^2 + \lambda_i = \alpha + u_{i-1}$; and
  (ii) then calculate the value $u_i^2$ such that $u_i^2 = u_{i-1} (\lambda_i + \lambda_{i-1} + u_{i-1} + 1)$ incrementing i from i=1 until the value $u_{k-1}^2$ is obtained;
(g) check if the equation $\lambda^2 + \lambda = \alpha^2 + u_{k-1}^2$ has solutions in $F_2^n$;
(h) if so, calculate said halving as follows:

$$u_o = \sqrt{u_o^2},$$

$$v_o = u_o(u_o + \lambda_o),$$

and $\left[\frac{1}{2}\right]P = (u_o, v_o)$; and (i) if not, add x to said second value $u_o^2$ and 1 to said first value $\lambda_o$ and calculate said halving as in step (h).

5. A method according to claim 1, where $F_2^n$ is a finite body of $2^n$ elements, $E(F_2^n)$ is the sub-group of an elliptic curve E defined by:

$E(F_2^n) = \{(x,y) \in F_2^n \times F_2^n | y^2 + xy = x^3 + \alpha x^2 + \beta\} \cup \{O\} \alpha, \beta \in F_2^n \beta \neq 0$ and $E[2^k]$ is the set of points P of said elliptic curve such that P added $2^k$ times to itself gives the neutral element O, where k is an integer greater than or equal to 1, wherein a point P=(x,y) of said elliptic curve represented by $(x, \lambda_p)$ with $\lambda_p = x + y/x$ gives by said halving the point $$\left[\frac{1}{2}\right]P = (u_o, v_o)$$

of said elliptic curve represented by
$(u_o, \lambda_o)$, with $\lambda_o = u_o + v_o / u_o$ obtained by effecting the following operations:
(a) seek for a first value $\lambda_o$ such that $\lambda_o^2 + \lambda_o = \alpha + x$;
(b) calculate a second value $u_o^2$ such that $u_o^2 = x \, (\lambda_o + \lambda_p + x + 1)$;

(c) if k has the value 1, check if the equation $\lambda^2 + \lambda = \alpha^2 + u_o^2$ has solutions in $F_2^n$;
(d) if so, calculate said halving as follows:

$$u_o = \sqrt{u_o^2},$$

and $\left[\frac{1}{2}\right]P = (u_o, \lambda_o)$;

(e) if not, add x to said second value $u_o^2$ and 1 to said first value $\lambda_o$ and calculate said halving as in step (d);
(f) if k is greater than 1, perform the following iterative calculation:
  (i) seek a value $\lambda_i$ such that $\lambda_i^2 + \lambda_i = \alpha + u_{i-1}$; and
  (ii) then calculate the value $u_i^2$ such that $u_i^2 = u_{i-1} (\lambda_i + \lambda_{i-1} + u_{i-1} + 1)$ incrementing i from i=1 until the value $u_{k-1}^2$ is obtained;
(g) check if the equation $\lambda^2 + \lambda = \alpha^2 + u_{k-1}^2$ has solutions in $F_2^n$;
(h) if so, calculate said halving as follows:

$$u_o = \sqrt{u_o^2},$$

and $\left[\frac{1}{2}\right]P = (u_o, \lambda_o)$; and (i) if not, add x to said second value $u_o^2$ and 1 to said first value $\lambda_o$ and calculate said halving as in step (h).

6. A method according to claim 1, further comprising constructing a common key from two secret keys respectively belonging to the aforementioned two entities and a public key consisting of the point P of odd order r of a chosen non-supersingular elliptic curve E.

7. A method according to claim 6, wherein a and b are the secret keys of first and second entities, respectively, and:
  (a) the first entity calculates the scalar multiplication [a]P and sends the result point to the second entity,
  (b) the second entity calculates the scalar multiplication [b]P and sends the result point to the first entity,
  (c) the two entities respectively calculate a common point (C)=(x,y) of said elliptic curve (E) by respectively effecting the scalar multiplications [a] ([b]P) and [b] ([a]P), both equal to [a.b]P, and
  (d) the two entities choose as their common key the coordinate (x) of said common point (C) obtained by said scalar multiplication [a.b]P, at least one of the preceding scalar multiplications, and preferably all of them, being effected by means of predefined halvings.

8. A method according to claim 7, wherein scalar multiplication using halvings is obtained by the following operations:
  (e) if said scalar of the multiplication is denoted S, choose m+1 values $S_0 \ldots S_m \in \{0,1\}$ to define S as follows:

$$S = \sum_{i=0}^{m} S_i \left(\frac{r+1}{2}\right)^i,$$

r being the aforementioned odd order and m being the single integer between $\log_2(r)-1$ and $\log_2(r)$,
  (f) calculate the scalar multiplication [S]P of a point P of said elliptic curve by the scalar S by applying an algorithm consisting of determining the series of points $(Q_{m+1}, Q_m \ldots, Q_i \ldots, Q_o)$ of said elliptic curve E such that:

$Q_{m+1} = O$ (neutral element), and $Q_i = [S_i]P + \left[\frac{1}{2}\right]Q_i + 1$ with $o \leq i \leq m$, and (g) calculate the last point $Q_o$ of said series giving the result $[S]P$ of said scalar multiplication.

9. A method according to claim 1, further comprising calculating a signature between two entities based on a pair of permanent keys belonging to one of the entities, one secret (a) and the other public (Q), by scalar multiplication of the secret key (a) by another public key consisting of the point (P) of odd order r of a chosen non-supersingular elliptic curve (E).

10. A method according to claim 9, further comprising the following operations:
   (a) the first entity (A) holding said pair of permanent keys constructs a single-use pair of keys, one key (g) being chosen arbitrarily and the other key [g]P resulting from scalar multiplication of said arbitrarily chosen key (g) by the public point P of said elliptic curve, the coordinates of the key ([g]P) being denoted (x,y) with $2 \leq g \leq r-2$,
   (b) the first entity (A) converts the polynomial x of said single-use key [g]P=(x,y) into an integer i whose binary value is represented by the sequence of binary coefficients of said polynomial x,
   (c) said first entity (A) calculates a signature (c,d) of the message (M) as follows:
   c=i modulo r
   $d=g^{-1}$ (M+ac) modulo r,
   (d) said first entity sends said message (M) and said signature (c, d) to said second entity; upon receiving it:
   (i) said second entity (B) checks if the elements of said signature (c,d) each belong to the range [1, r−1],
   (ii) if the check in step (i) is no, the second entity declares the signature invalid and stops;
   (iii) if the check in step (i) is yes, said second entity (B) calculates three parameters:
   $h=d^{-1}$ modulo r,
   $h_1$=Mh modulo r, and
   $h_2$=ch modulo r,
   (e) said second entity calculates a point T of said elliptic curve by summing the scalar multiplications of the points P and Q by the last two parameters cited:

$T=[h_1]P+[h_2]Q$, and (i) if the resultant point T is the neutral element, said second entity declares the signature invalid and stops;
   (ii) if the resultant point T is not the neutral element, considering the point T with coordinates x' and y': T=(x',y'),
      (A) said second entity (B) converts the polynomial x' of that point into an integer i' whose binary value is represented by the sequence of binary coefficients or said polynomial x',
      (B) said second entity (B) calculates c'=i' modulo r and,
      (C) said second entity (B) checks if c'=c, in which case said second entity (B) validates said signature, or if not, said second entity (B) invalidates said signature, at least one aforementioned scalar multiplication operation being effected by means of the predefined halvings.

11. A method according to claim 1, wherein said integer is decomposed as a set of values using powers of half said order, and said addition and halving operations are implemented dependent on said set of values.

* * * * *